United States Patent

[11] 3,610,833

[72] Inventor Gabriel Lebegue
Massy, France
[21] Appl. No. 832,731
[22] Filed June 12, 1969
[45] Patented Oct. 5, 1971
[73] Assignee C.I.T. Compagnie Industrielle des Telecommunications
Paris, France
[32] Priority June 12, 1968
[33] France
[31] PV 154 760

[54] DEVICE FOR THE DOUBLE-CALL OPERATION OF A TELEPHONE SET CONNECTED TO AN EXCHANGE BY RADIO CHANNEL
14 Claims, 3 Drawing Figs.

[52] U.S. Cl. ........................................................ 179/16 E, 179/41 A, 179/18 AH
[51] Int. Cl. ........................................................ H09q 7/04
[50] Field of Search ........................................... 179/16.4, 16.45, 41 A, 43, 16.4, 16.1, 16.09, 18; 325/13; 178/71 G, 70 S

[56] References Cited
UNITED STATES PATENTS
3,118,018 1/1964 Cornell et al. ................ 179/41 UX

*Primary Examiner*—Kathleen H. Claffy
*Assistant Examiner*—Jan S. Black
*Attorney*—Craig, Antonelli & Hill

ABSTRACT: Device for the double call operation of a telephone set connected to an exchange by radio channel including a first repeater connected between the telephone set and the associated radio equipment and a second repeater connected between the exchange and its associated radio equipment, the repeater at the exchange end comprising a reception relay which is warned by the repeater at the telephone set end, and in turn initiating a switching process the result of which is communicated to the repeater at the telephone set end, each repeater thus indicating in turn to the other the partial result attained until the command requested by the telephone set is effectively transmitted to the exchange as if the link had been metallic from end to end.

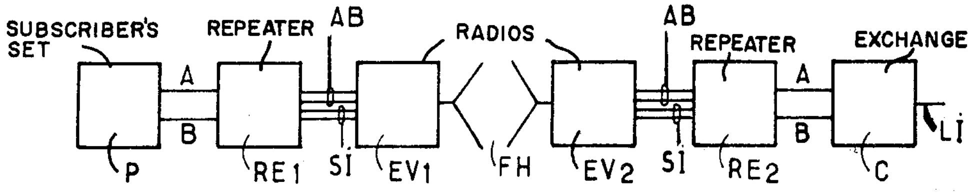

DEVICE FOR THE DOUBLE-CALL OPERATION OF A TELEPHONE SET CONNECTED TO AN EXCHANGE BY RADIO CHANNEL

The present invention relates to a device for the double-call or call transfer operation of a telephone set connected to an exchange by radio channel. Its aim is more particularly to provide a telephone set connected to an exchange by radio beam with the same operating possibilities as if the connection were a normal metallic connection.

It is already known to connect one or more telephone sets of an installation to an exchange by radio beam, but hitherto operation has been limited to a single call by automatic channel of a correspondent, who is himself connected to the exchange by metallic channel or by radio channel.

The aim of the invention is to provide a device for transferring between two subscribers connected by radio beam a communication directly from a supplementary telephone set to another supplementary telephone set by double call and dialing, the transfer taking place on ringing off at the first telephone set, which also produces the disengagement of the line and engaged members.

According to a known arrangement, the chain of members between the telephone set and the exchange to which it is connected comprises two members in series, the radio channel equipment and the repeater, placed symmetrically of the radio beam, one of the repeaters being connected to the telephone set and the other repeater being connected to the exchange.

According to another known arrangement, the telephone set is connected by two wires to the first repeater, the function of the latter being to separate the conversation channel from the signalling channel, the connection of the repeater to the first radio channel equipment being by four wires, two wires of voice frequencies (conversation and ringing tones) and two wires of direct-current signalling.

According to another known arrangement, symmetrical relative to the radio beam, the exchange is connected by two wires to the second repeater, the connection of the latter to the second radio channel equipment being by four wires, the second repeater and the second radio channel equipment having respectively functions similar to the first repeater and to the first radio channel equipment.

According to another known device, one of the two signalling wires in each repeater serves to transmit signals to the other repeater, and the second signalling wire permits reception of signals from the other repeater.

According to another known device, each of the two wires of the telephone set is closed, at the repeater, across the series windings of two relays, one of the relays being the supply relay and the other relay being a differential relay, the ampere-turns of the two windings being additive for the supply relay and subtractive for the differential relay, such that on lifting the receiver, the supply relay is engaged and the differential relay disengaged, but when one of the line wires has polarity applied to it by the double-call telephone set, the two relays pick up simultaneously, the two relays being in the off-position when the set is rung off and without double call.

The present invention is directed to a call transfer arrangement for a double call type of telephone connection. In a subscriber installation having supplementary stations being connected to an exchange, there exists the two fold capability of the same telephone station being in communication with, or switched to a network line, on one hand, and another internal station on the other hand, by means of the exchange. In general, each subscriber's telephone set will include two push buttons, one for private links and one for an external or network link. The network button makes it possible to set up a connection with a network line which is connected to the exchange, while the private button permits calling another internal station while maintaining the network line in a hold condition in order that communication may be made with either the private line or the network line, while one or the other is on hold.

The call transfer arrangement for a double call telephone system in accordance with the present invention is concerned with a subscriber installation having supplementary stations in which the stations may be connected to a network line or to an internal line. The various supplementary stations may then be connected to the same central exchange are known as "subscriber extension stations."

For transferring a network line from one internal station to another internal station, the network line is put on hold, and the other internal station is dialed and called, whereby the network line may be subsequently transferred to the other internal station by flashing the hook switch on the telephone handset of the initial internal station or extension.

The present invention is directed to a connecting device, in a subscriber installation having supplementary stations, between a station and its central equipment exchange. This connecting device comprises a nonmetallic portion and has telephone equipment at the station side allowing for the same types of connections that would exist if the station were connected to the exchange by means of a metallic connection. In other words, call transfer in a double call arrangement is possible and the end equipment includes repeater relays for the control and connection between one end system and the equipment or system transmission equipment comprising two conversation lines and at least one control line or lead for the transmission of instructions or orders between the respective network stations. In other words, the present invention is directed to the end equipment and not to the Hertzian linkage or particular from of communication transmission between the stations.

A subscriber installation having supplementary stations is a telephone exchange servicing a particular organization and is connected to a public telephone exchange. It should be noted that the various stations P of the installation, to which the present invention is directed, are each connected to the central equipment by means of another circuit identical to the one shown and comprising a radio connection, or directly by means of a metallic connection. In the case of a pure radio connection, there are as many different connections as there are stations.

The device according to the invention is more particularly characterized in that it comprises two repeaters, inserted at either end of the radio beam in the link between the telephone set and the exchange, the connection between each repeater and its radio channel equipment being by four wires, of which two are assigned, in each direction to the transmission of direct-current commands, the other two being reserved for the transmission of audible signals, each repeater being composed of a certain number of relays, but the two repeaters being different, the repeater at the telephone set end comprising two relays controlled individually or simultaneously by the set, depending on the function to be performed, each command triggering a particular switching process, the repeater at the exchange end comprising a reception relay which is warned by the repeater at the telephone set end and in turn initiates a certain switching process, the result of which is communicated to the repeater at the telephone set end, each repeater thus indicating in turn to the other the partial result obtained until the command made by the telephone set is effectively transmitted to the exchange, as if the connection had been metallic from end to end, the repeaters then returning either to the initial position in the case of a double-call command, or to the inoperative position in the case of a disengagement command.

According to one feature of the invention, the operation of double call or disengagement at the telephone set initiates in the first repeater connected to it a switching process by relays, such that a partial state is determined and transmitted to the repeater at the exchange end in which another switching process is thus initiated, likewise terminating in a partial result, retransmitted to the first repeater, the latter then continuing its switching process up to the delivery of a second partial result, similarly communicated to the second repeater, in which the switching process may then be continued, the exchange of signals thus established between repeaters continuing until the exchange has been provided with the same signals as if the telephone set had been connected to it directly by wires in a manner to permit mutual autoverification of the operation between the repeaters.

According to another feature of the invention, the repeater at the telephone set end comprises a differential relay which is set in operation in the event of a double-call command being given by the telephone set, and thereby engages between the repeaters at the telephone set end and the exchange end a switching process in four stages, each of which corresponds to a limited switching process.

According to yet another feature of the invention the repeater at the telephone set end comprises a loop relay which drops out in case of a disengagement command given by the telephone set at the ringing moment, and thereby engages between the repeaters at the telephone set end and exchange end a switching process in five stages, each of which corresponds to a limited switching process.

According to yet another feature of the invention, some of the relays forming part of the device according to the invention are also used for performing other functions, in particular for transmitting the signals corresponding to picking up the receiver and dialing.

One advantage of the device according to the invention is that it does not make use of pulse calibration, which is an unreliable and expensive method.

Another advantage of the device according to the invention is that it does not use any digital coding system, which would have the disadvantage of producing two different operations for the double call, one by dialing and the other by push button, as is usually done.

Other features of this invention will appear in the course of the following description, and in the drawings of an embodiment of the device, the features of which following both from the description and drawings, form of course part of the invention.

In these drawings, given solely as nonrestrictive example:

Figure 3:
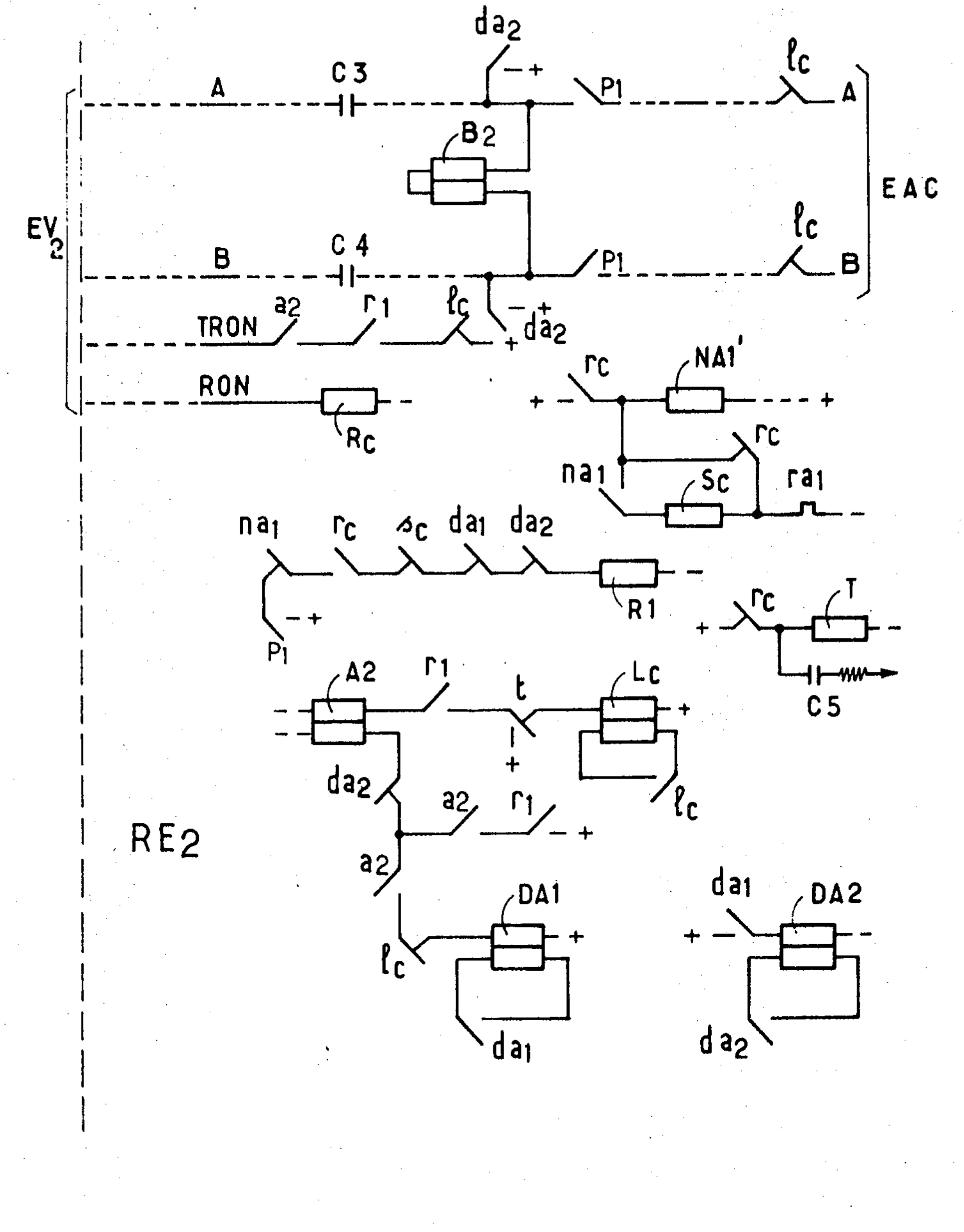

FIG. 3 shown by way of example a partial diagram of the embodiment of a repeater at the exchange end.

Figure 1:
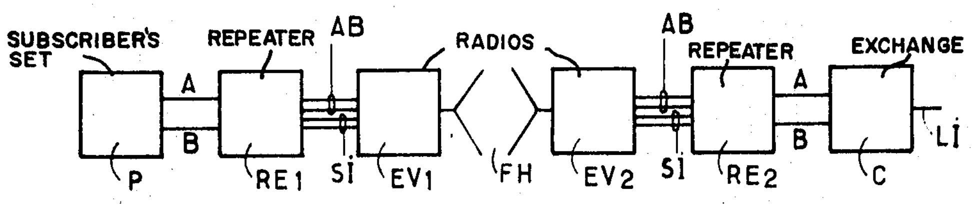
FIG. 1 shows diagrammatically a radio beam type of link between a telephone set and an exchange.

In the embodiment shown in the figures, FIG. 1 shows a radio link between a subscriber's set P and an exchange C, to which it is connected. The set P is connected by two line wires A and B to a repeater RE1, which is connected in turn to radio channel equipment EV1 by four wires:- the two line wires A and B and two signalling wires S1. The two wires A and B then carry only audible signals: conversation, invitation to dial, call return, engaged tone, etc. while the signalling wires S1 are used for transmitting and receiving commands between the repeater RE1 and a repeater RE2 at the exchange end. The repeater RE2 is connected on one side by four wires (AB and S1) to radio channel equipment EV2, and on the other side by two wires (A and B) to the exchange C which may, for example, be connected in turn to other public and private exchanges by links LI. The channel equipment EV1 and EV2 are in communication with each other by radio beam FH both in the direction EV1 to EV2 and in the direction EV2 to EV1. Other telephone sets P may be connected to the exchange C either by radio channel, as indicated in FIG. 1, or by wholly metallic channel as is normally the case.

Figure 2:
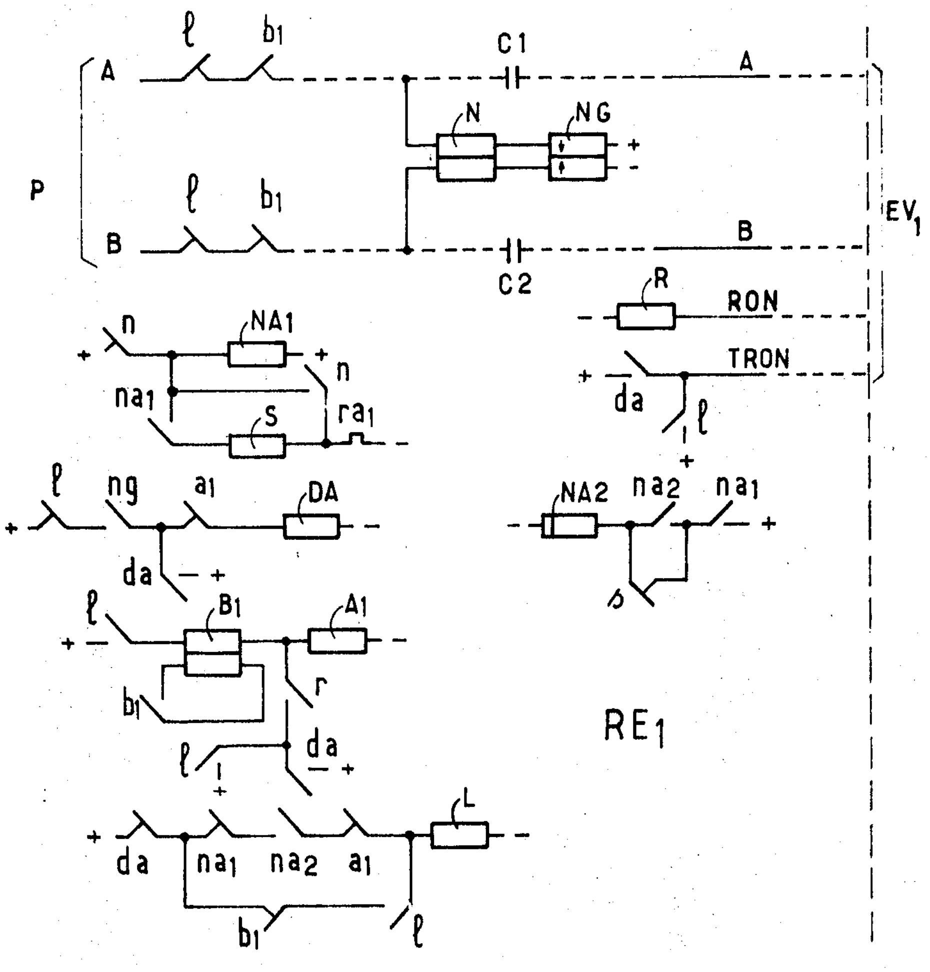
FIG. 2 shows by way of example a partial diagram of the embodiment of a repeater at the subscriber's end.

FIG. 2 is a partial diagram of a repeater RE1 according to the invention, the relays being represented by rectangles marked with capital letters; the contacts of a relay are marked by the lower case letters corresponding to the relay.

The line AB is extended to the subscriber's set P; it comprises in each wire two break contacts in series forming part of relays L and B1; the line is closed, for each wire, across the series windings of relays N and NG, at the end of which are respectively the positive polarity supply for the wire A and the negative polarity supply for the wire B. The relay N is an additive flux relay, that is to say, the magnetic flux passing through the magnetic circuit is the sum of the fluxes of the two windings, while the relay NG is a differential flux relay, that is to say, the sum of the fluxes is zero when current flows through both windings; if the current passes through only one winding of NG, this relay may pick up. Direct current thus closing across the relays N and NG, only the alternating currents (conversation, tones) pass across the capacitors C1 and C2 in series respectively on wires A and B.

A reception relay R receives by the wire RON the commands coming from the exchange-end repeater RE2; the transmission wire TRON, on the contrary, transmits to the repeater RE2 the orders coming from the repeater RE1 by means of one of the two make contacts *da* or *l* of relays DA or L. The four wires A, B, RON and TRON are connected to the channel equipment EV1 for transmission by radio beam of the commands thereon along with the modulation of the conversation.

FIG. 3 is a partial diagram of the repeater RE2 situated at the exchange end; the wires A, B, RON and TRON come from the channel equipment EV2; on the right hand the wires A and B go to the subscriber's equipment in the exchange EAC. The wires A and B close with direct current across an inductance $B_2$ of high impedance for conversation currents; whereas, the conversation currents pass easily across the capacitors C3 and C4 in series with the line and which present only a low impedance to the said currents. Each line wire comprises in series a make contact $P_1$ of a connection relay $P_1$ and a break contact $l_c$ of a relay $L_c$. It should be noted that the wire called RON in the repeater RE1 (FIG. 2) becomes TRON in the repeater RE2 and, conversely, the wire called TRON in the repeater RE1 becomes RON in the repeater RE2. Each wire RON, in its repeater, is terminated by a reception relay R; each wire TRON, in its repeater, is terminated by a potential applied across different relay contacts.

The following gives, purely as an indication, the names of the relays in the two repeaters according to the references in FIGS. 2 and 3. The repeater at the telephone set end (FIG. 2) comprises:

a supply relay N, a differential relay NG, a double-call relay DA, a reception relay R, a first auxiliary relay $A_1$, a first dialing relay NA1, a second dialing relay NA2, a disengagement relay L, a second auxiliary relay $B_1$, and a series relay S. The repeater at the exchange end (FIG. 3) comprises: a connection relay $P_1$, a first auxiliary relay NA1', a series relay $S_c$, a delay relay T, a reception relay $R_c$, a first command preparation relay R1, a second command preparation relay $A_2$, a first double-call relay DA1, a second double-call relay DA2, and a disengagement relay $L_c$.

Details of the functions in the two cases of operation forming more particularly the object of the invention: the case of double call with transfer and case of disengagement, will be given by way of example in the following:

CASE OF DOUBLE CALL WITH CALL TRANSFER

Simple double call permits calling a third subscriber of any category while connected to a second subscriber, but the transfer of the call to the third subscriber is authorized only if this third subscriber can receive the external network. This is the term applied to the possibility given to a first subscriber connected to a private exchange, but capable of being connected to an external network, already in conversation with a second subscriber connected to the external network, of being able to call a third subscriber of the same category as the first subscriber and of passing to him the second subscriber without the aid of a telephone operator; this is a direct transfer which is generally effected on dialing the third subscriber after pressing a pushbutton on the subscriber set, or after dialing an agreed number by means of the calling party dial, the effective transfer occurring when the first subscriber rings off.

Practically, pressing the pushbutton at the subscriber's telephone set produces a grounding of the line wires; although there is radio connection with the exchange rather than a metallic connection, this operation must be translated by the same effect as a metallic connection, that is to say, at the exchange the line wires should be found to be grounded.

It is assumed that the first subscriber is in conversation, therefore in the repeater RE1 (FIG. 2), the relay N is energized, being looped to the line, but the relay NG is not due to differential fluxes in the two windings thereof. The relay NA1 is energized by means of the make contact of relay N and the negative polarity of the resistor $ra_1$; relay NA1 has a holding circuit, independent of the relay N, across the relay S and the resistor $ra_1$. The relay NA2 is energized by means of a make contact of NA1 and a normally closed break contact of the relay S.

If in this condition, the subscriber makes a double call, the ground polarity on the line wires has the effect of short-circuiting the top winding of the relay NG in which only the bottom winding then produces flux. This flux is sufficient to ensure actuation of the relay NG. The double-call relay DA is energized across the normally closed break contact of the relay $A_1$, the make contact *ng* of relay NG, and the normally closed break contact *l* or relay L to positive polarity. The relay DA is held by its make contact and the break contact of relay $A_1$ and, by means of another make contact, applies positive polarity to the wire TRON.

In the conversation state of the "exchange" end repeater RE2 (FIG. 3), the connection relay $P_1$ is energized by a circuit, not shown here; the relay NA1′ is also energized by means of the break contact $r_c$ of relay $R_c$ and negative polarity across the resistor $ra_1$; the relay $S_c$ is short-circuited by means of the make contact of NA1′, the relay T picks up and the capacitor $C_5$ is charged.

On receiving potential from the repeater RE1, the relay $R_c$ of the repeater RE2 (FIG. 3) picks up. The relay T drops out with delay during the discharge of the capacitor C5, and the short circuit of relay $S_c$ is removed so that $S_c$ is actuated. The relay NA1′ is deactuated by closing of the make contact of $R_c$, and the relay $S_c$, no longer receiving positive potential due to being disconnected by the make contact of NA1′, which has returned to the off-position, drops off in its turn. The relay R1 is energized via the break contact of DA2, the break contact of DA1, the break contact of the connecting relay $P_1$ and positive polarity.

Pickup of the relay R1 means that there is either double call or disengagement, since these are the only possibilities provided on the wire TRON in the repeater RE1 at the telephone set end (FIG. 2). Pick up of R1 produces pick up of the relay $A_2$ by positive polarity, make contact of relay T (not yet dropped out) and make contact of relay R1. The relay $A_2$ prepares the discrimination circuit as between double call and disengagement. It is held by a second winding receiving positive polarity by way of make contact of relay R1, make contact of relay $A_2$ and break contact of relay DA2.

Positive polarity is applied to the wire TRON of the repeater RE2 by the break contact of relay $L_c$, the make contact of relay R1, the make contact of relay $A_2$, which causes pick up of the relay R in the repeater RE1 (FIG. 2). This request from RE2 to RE1 is intended to remove doubt: the reply from RE1 and RE2 will say whether double call or disengagement is involved, according to the state of the relays, which is presented at that moment in RE1.

Pick up of relay R of RE1 causes the relay $A_1$ to pick up by positive polarity, the make contact of relay DA, the make contact of relay R and produces drop out of the relay DA, disconnected by the break contact of relay $A_1$ in the make position. The positive polarity, which had been applied to the wire TRON is suppressed because of the return to the off-position of the relay DA. The relay $A_1$ drops out in turn, being disconnected by relay DA.

In the repeater RE2 (FIG. 3), the relay $R_c$ drops out; the relay T, which has not dropped out, recovers its normal pickup circuit by the off-position of $R_c$. The relay NA1′ picks up again by way of the break contact of $R_c$, the resistance $ra_1$ and negative polarity. The relay $S_c$, which had not picked up, is short-circuited by the break contact of relay $R_c$ and the make contact of relay NA1′. The relay R1 drops out, the make contact of relay $R_c$ and the break contact of relay NA1′ being open. The relay DA1 is actuated by dropout of the relay R1 in series with the bottom winding of the relay $A_2$ by way of the break contact of relay $L_c$, make contact of relay $A_2$ and break contact of relay DA2. The relay DA1, by means of its contact *da*1, short-circuits its own bottom winding. The relay DA2 picks up in its turn by the positive potential at the make contact *da*1 and short-circuits its bottom winding.

The relay DA2 produces the doulbe-call command by the positive potential applied to the line wires A and B by means of the make contacts *da*2. Thus, the exchange is warned of the double-call command. The relays $A_2$ and DA1, which remain in series, drop out, being disconnected by the make contact of DA2. The relay DA1 drops out slowly (short-circuited winding) and on its dropout being completed, disconnects the relay DA2, which also drops out slowly. The positive polarity applied to the line wires by DA2 remains there for a time corresponding to the drop out of relays DA1 and DA2.

The repeater RE2 is situated again exactly in the same state as before the double-call operation. In the repeater RE1 (FIG. 2), the relay R has dropped out after the relay R1 of the repeater RE2 (FIG. 3) has returned to the off position.

CASE OF DISENGAGEMENT

As in the first case, in the repeater RE1 (FIG. 2), it is assumed that a conversation period has commenced, that is to say, the relays N, NA1 and NA2 have picked up and the relay S is short-circuited.

Disengagement, which is operated by ringing off at the telephone set P causes the relay N to drop out, the loop of the set being disconnected. The relay NA1, short-circuited by the break contact of relay N, drops out and causes the relay NA2 to drop out, the supply circuit of which is disconnected by the make contact of relay NA1 in the off position. The relay NA2 has a delay ring and therefore drops out slowly. During this drop-out delay of relay NA2, the relay L picks up by the break contact of relay A1, make contact of relay NA2 (which has not yet dropped out), the break contact of relay NA1, break contact of relay DA and positive polarity. The relay L is held in the picked-up position by the make contact of relay L, the break contact of relay $B_1$, the break contact of relay DA and positive potential. The relay L, by means of another make contact, applies positive potential to the wire TRON and disconnects the two line wires. It will thus be noted that, by a process different from that in double call, positive potential is applied to the wire TRON as in the first case.

In the repeater RE2 (FIG. 3), which is in absolutely the same initial state as in the first case, the same conditions producing the same effects, the same process takes place, that is to say, pick up of relay $R_c$, slow drop out of relay T, relay $S_c$ picks up, relay NA1′ drops out, being short-circuited, relay $S_c$ drops out, relay R1 picks up, and relay $A_2$ picks up. Positive potential is thus applied to the wire TRON, exactly as in the first case.

Obviously, in the repeater RE1 (FIG. 2), the effects of pickup of the relay R will be different, since the double-call command and the disengagement command have been given from different relays (NG for double call, N for disengagement). The relay R produces pickup of the relay $A_1$ by positive potential, make contact of the relay L and make contact of the relay R, but whereas in the case of double call, the relay $A_1$ causes the relay DA to drop out, thus producing suppression of positive potential on the wire TRON, in the present case of disengagement, the relay $A_1$ does not disconnect the relay L. The latter is held by the make contact of relay L, the break contact of relay $B_1$ and the break contact of relay DA, and therefore does not suppress the positive potential applied to the wire TRON.

In the repeater RE2 (FIG. 3), the relay $R_c$ is maintained in the on-position, but this time, relay T, not having its pickup circuit, exhausts its delay and drops out. Dropout of the relay T permits pickup of the relay $L_c$ by the break contact of relay T and the make contact of relay R1 in series with the relay $A_2$, which has already picked-up as seen above. The relay $L_c$ reflects the opening of the line (already done in the repeater RE1) on the line wires of RE2, exchange end. The connection relay $P_1$ drops out, which will finally maintain the opening of the loop. Drop out of the connection relay $P_1$ causes drop out of the relay R1. Dropout of relay R1 in turn causes drop out of the relay $A_2$, then drop out of relay $L_c$ delayed by its short-circuited winding, as a safety measure for preventing unwanted pickup of the relay DA1. On the other hand, the positive potential applied to the wire TRON is suppressed on pickup of the relay $L_c$.

In the repeater RE1 (FIG. 2), the relay R drops out, the effect of which is to actuate the relay $B_1$, which picks up in series with the relay $A_1$, which has already picked-up, as seen above. The relay $B_1$ picks up and causes the relay L to drop out; on the other hand, the relay $B_1$ short-circuits its bottom winding by its own make contact. The relay $L_1$ in dropping out, causes the relays $B_1$ and $A_1$ to drop out, the relay $B_1$, with delayed dropout, being the last to revert to the off-position. The positive potential applied to the wire TRON pickup of the relay L, disappears.

In the repeater RE2 (FIG. 3), the relay $R_c$ drops out and the relay T picks up again. The two repeaters RE1 and RE2 are in the inoperative position again.

Of course, the invention is by no means limited to the embodiment described and shown, which is given merely as example. In particular, without departing from the scope of the invention, modifications of detail may be made, certain arrangements may be changed or certain mans may be replaced by equivalent means.

It is evident that the scope of the invention will include all embodiments effecting the discrimination of commands by limited switching processes taking place between two repeaters responding to each other, this obviating in particular processes employing more expensive and unreliable coding or pulse calibration processes.

I claim:

1. In a system for double-call communication telephone sets connected to exchange equipment by a radio channel in a subscriber system having supplementary sets connected to the exchange equipment, permitting double call and communication transfer from one telephone set to another, the system permitting each subscriber connected to the exchange by radio channel to have the same possibilities of operation as telephone sets connected to the exchange by metallic line, a device comprising two repeaters connected to respective radio channel equipment inserted one at each end of the radio beam in the link between the telephone set and the exchange equipment, the link between each repeater and its associated radio channel equipment being effected by four wires, two of which provide for the transmission in each direction of orders in direct current and the other two being reserved for the transmission of voice frequency signals.

2. Device according to claim 1 wherein the repeater connected to said telephone set includes a supply relay connected in a loop circuit with said telephone set to be actuated upon closing of said loop, a differential relay connected in said loop circuit to be actuated by a selective operation at said telephone set indicating a double-call operation, and double-call relay means responsive to operation of said differential relay for transmitting a first order to the repeater at the exchange end indicating initiation of an operation.

3. Device according to claim 2 wherein the repeater connected to said exchange equipment includes command preparation relay means for transmitting a second order to the repeater at the telephone set end indicating readiness to receive further control and an exchange reception relay responsive to said first order for actuating said command preparation relay means.

4. Device according to claim 3 wherein said command preparation relay means includes a first command preparation relay actuated by said reception relay, and a second command preparation relay responsive to actuation of said first command preparation relay to apply said second order for transmission to the repeater at said telephone set end.

5. Device according to claim 4 wherein said command preparation relay means further includes a normally actuated delay relay deactuated in response to operation of said reception relay after a predetermined time delay, said second command preparation relay operable only prior to deactuation of said delay relay.

6. Device according to claim 3 wherein the repeater connected to said telephone equipment includes a telephone reception relay actuated by receipt of said second order from the repeater connected to said exchange equipment and an auxiliary relay actuated in response to operation of said telephone reception relay and said double call relay to deactuate said double call relay and thereby terminate transmission of said first order.

7. Device according to claim 6 wherein the repeater connected to said exchange equipment further includes double call relay control means responsive to termination of transmission of said first order deactuating said exchange reception relay and said first command preparation relay for applying a supervisory signal to the loop connected to said exchange equipment indicating double call.

8. Device according to claim 2 wherein the repeater connected to the telephone set further includes a telephone disengagement relay responsive to deactuation of said supply relay due to opening of said loop circuit for transmitting a first order to the repeater at the exchange end indicating initiation of an operation.

9. Device according to claim 8 wherein the repeater connected to said exchange equipment includes command preparation relay means for transmitting a second order to the repeater at the telephone set end indicating readiness to receive further control and an exchange reception relay responsive to said first order for actuating said command preparation relay means.

10. Device according to claim 9 wherein said command preparation relay means includes a first command preparation relay actuated by said reception relay, and a second command preparation relay responsive to actuation of said first command preparation relay to apply said second order for transmission to the repeater at said telephone set end.

11. Device according to claim 10 wherein said command preparation relay means further includes a normally actuated delay relay deactuated in response to operation of said reception relay after a predetermined time delay, said second command preparation relay operable only prior to deactuation of said delay relay.

12. Device according to claim 11 wherein the repeater connected to said exchange equipment further includes an exchange disengagement relay operated during operation of said first command preparation relay in response to deactuation of said delay relay to open the loop circuit including the exchange equipment and deactuate said first command preparation relay terminating the transmission of said second order.

13. Device according to claim 12 wherein the repeater connected to said telephone set includes auxiliary relay means responsive to termination of the transmission of said second order at the time said telephone disengagement is actuated to deactuate said telephone disengagement relay and thereby terminate transmission of said first order.

14 In a system for connecting a telephone station connected to exchange equipment by a radio channel in a telephone exchange equipment serving an individual organization and having connections to a public telephone exchange, a device for double communication and/or call transfer from one telephone station to another, said device comprising two repeaters connected one between a respective radio channel equipment and a telephone station, the other between a second radio equipment, and said telephone exchange equipment, each repeater comprising relay means responsive to orders given by said telephone station, the link between each repeater and its radio channel equipment comprising two wires for the transmission or orders and two wires for the transmission of voice signals.